Dec. 1, 1970 D. T. N. WILLIAMSON ET AL 3,543,375

POSITIONING DEVICES

Filed Aug. 29, 1968 6 Sheets-Sheet 1

Inventors
David T. N. Williamson
Richard Graham Crosland
Edward Henry Parke
By Watson, Cole, Grindle & Watson
Attorneys

POSITIONING DEVICES

Filed Aug. 29, 1968 6 Sheets-Sheet 2

Inventors
David T. N. Williamson
Richard Graham Crosland
Edward Henry Parke
BY Watson, Cole, Grindle & Watson
attorneys Inventors
David T. N. Williamson
Richard Graham Crosland
Edward Henry Parke
BY Watson, Cole, Grindle & Watson
Attorneys Inventors
David T. N. Williamson
Richard Graham Crosland
Edward Henry Parke
BY
Watson, Cole, Grindle & Watson
Attorneys Inventors
David T. N. Williamson
Richard Graham Crosland
Edward Henry Parke
BY Watson, Cole, Grindle & Watson
Attorneys Inventors
David T. N. Williamson
Richard Graham Crosland
Edward Henry Parke
BY Watson, Cole, Grindle & Watson
Attorneys 3,543,375

POSITIONING DEVICES

David Theodore Nelson Williamson, Richard Graham Crosland, and Edward Henry Parke, London, England, assignors to Molins Machine Company Limited, London, England, a corporation of Great Britain Filed Aug. 29, 1968, Ser. No. 758,183
Claims priority, application Great Britain, Sept. 13, 1967, 41,871/67
Int. Cl. B23p *19/04;* B23q *7/00*
U.S. Cl. 29—200 10 Claims

ABSTRACT OF THE DISCLOSURE

A positioning device for bringing a transporter to a desired position along a storage rack under control of electric signals (e.g. from a computer) comprises a number of parallel magnetic strips secured to the rack and disposed in a numerically coded pattern, and reed switches secured to the transporter so as to register with the strips. Circuitry connected to the switches and receiving the electrical signals derives the difference between the number sensed by the switches (according to the pattern of the strips at the transporter position) and the number represented by the signals and controls drive means for the transporter.

This invention relates to positioning devices, especially although not necessarily exclusively, to such devices adapted to control the positioning of a movable member in response to signals received from an electronic computer.

A convenient example of the application of such a device is found in the machine tool system disclosed in U.S. application Ser. No. 695,817. That system includes a storage device, in the nature of an elongated rack, containing a large number of compartments disposed in columns and rows, the compartments being capable of accommodating pallets or tool magazines (carrying workpieces or tools respectively). Associated with each longitudinal vertical face of the rack is a transporter for carrying pallets and tool magazines to and from the compartments, and a positioning device, such as that of the present invention, is required to control the movements of each transporter so as to bring the latter into proper register with any selected column of the compartments when a pallet or tool magazine is to be moved into or out of a compartment in that column.

According to the present invention there is provided a positioning device for controlling movement of one member relative to another, comprising a plurality of markers fixed relative to one of the members, the markers being so disposed that the markers carried at any position along the one member form a pattern constituting a coded indication of the position, sensing means fixed relative to the other of the members, the sensing means being disposed as to confront the markers and to provide electrical indications corresponding at any instant to the pattern of markers confronting the sensing means, and electrical means arranged to respond to the electrical indications and to electrical signals (e.g. from a computer) denoting a desired relative position of the members to supply control signals to drive means so that the drive means cause relative movement between the members until the electrical indications correspond in a predetermined manner to the electrical signals.

The markers may take various forms but very conveniently may be arranged to give digital, preferably binary, coded indications of positions. In a preferred arrangement, one of the members carries a plurality of parallel marker strips, each strip extending (e.g. horizontally) along different portions of the length of the member, so that at any position along the length of the member, a combination of portions of the strips is present which denotes (e.g. in binary notation, considering a strip portion as representing "1" and absence of a strip portion as representing "0") a number indicative of that position.

The sensing means may take various forms; according to another aspect of the invention, there is provided a sensing device comprising a plurality of reed switches each adapted to change its state (and hence provide an electrical indication) when subjected to a magnetic field, the switches being arranged to confront a plurality of magnetised marker strips arranged in portions forming a coded pattern, so that each switch confronting one of the strip portions is subjected to a magnetic field from the latter and provides one form of electrical indication while each switch not confronting one of the strip portions is not subjected to a magnetic field and provides another form of electrical indication, whereby for any selected position of the switches relative to the strips the electrical indications furnished by all the switches collectively correspond to the arrangement of the strips at the selected position.

To assist in a full understanding of the invention, a preferred embodiment thereof will now be described; in this embodiment, the invention is applied to a machine tool installation as disclosed in the aforementioned copending application. Reference will be made to the accompanying drawings, in which.

Figure 1:
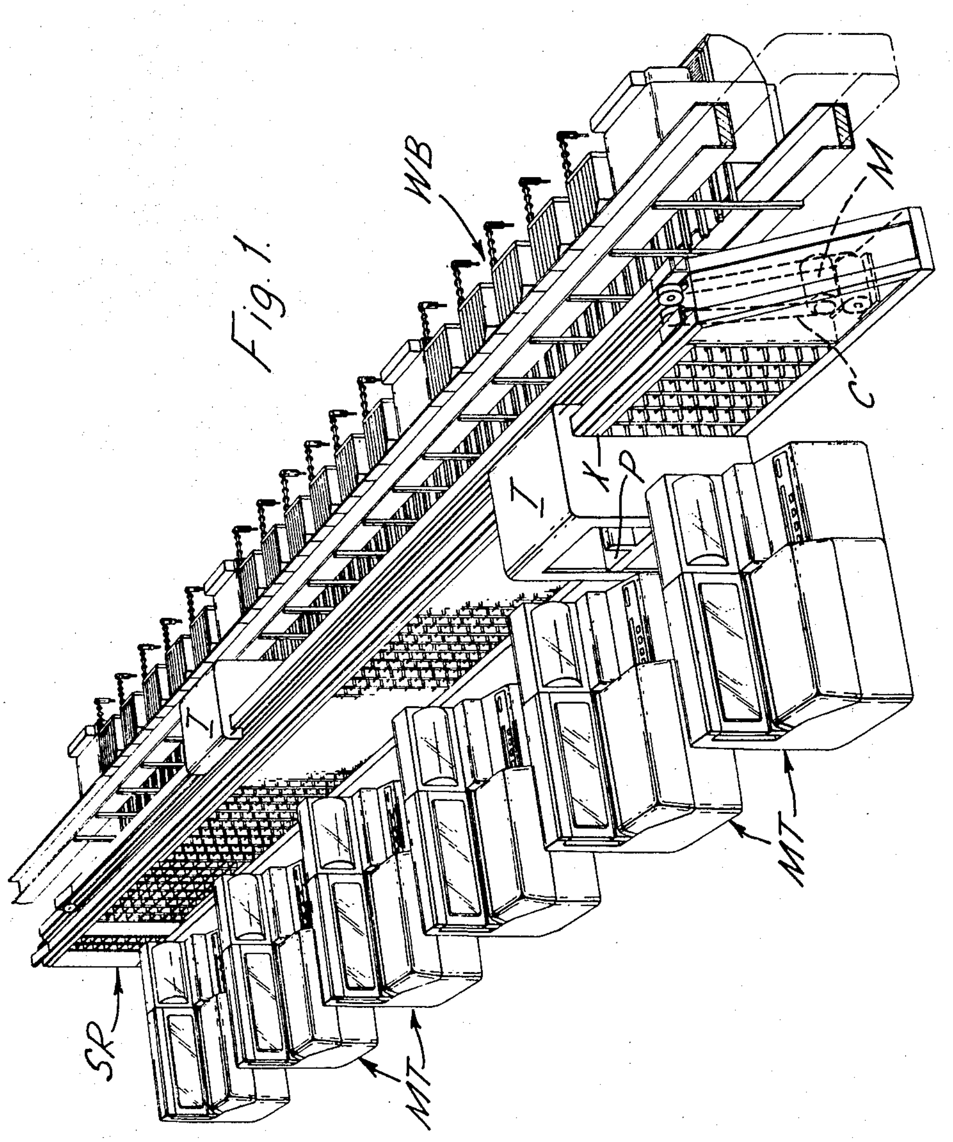
FIG. 1 is a perspective view of a machine tool installation as disclosed in the aforementioned copending application.

Referring first to FIG. 1, the machine tool installation here shown comprises six machine tools MT, a storage rack SR, a work-preparation bench WB, and two transporters T. Very briefly, the operation of the system may be indicated by saying that workpiece blanks for machining are loaded onto pallets by operators (not shown) at bench WB, each pallet when loaded being carried by the adjacent transporter T to a selected one of many compartments in the rack SR; the same transporter serves when required to carry pallets bearing wholly or partially machined workpieces from the rack SR to the bench WB.

The other transporter serves to carry loaded pallets from (and to) compartments in the rack SR to (and from) the machine tools MT. The whole system is controlled by an electronic computer (not shown) and it will be apparent that the speed and efficiency of operation will be greatly influenced by the speed and accuracy with which each of the transporters can be brought into position in alignment with successively selected compartments in the rack SR.

Each movement of one of the transporters T to a new position requires the transporter to move horizontally into alignment with a selected cloumn of compartments in the rack SR, and also a platform P within the transporter T must move vertically into alignment with a selected row of said compartments. The positioning device of the present invention is herein described in relation to the horizontal movement of the transporter T. Each of the transporters T is driven by a motor M by means of a chain C.

Figures 2, 7:
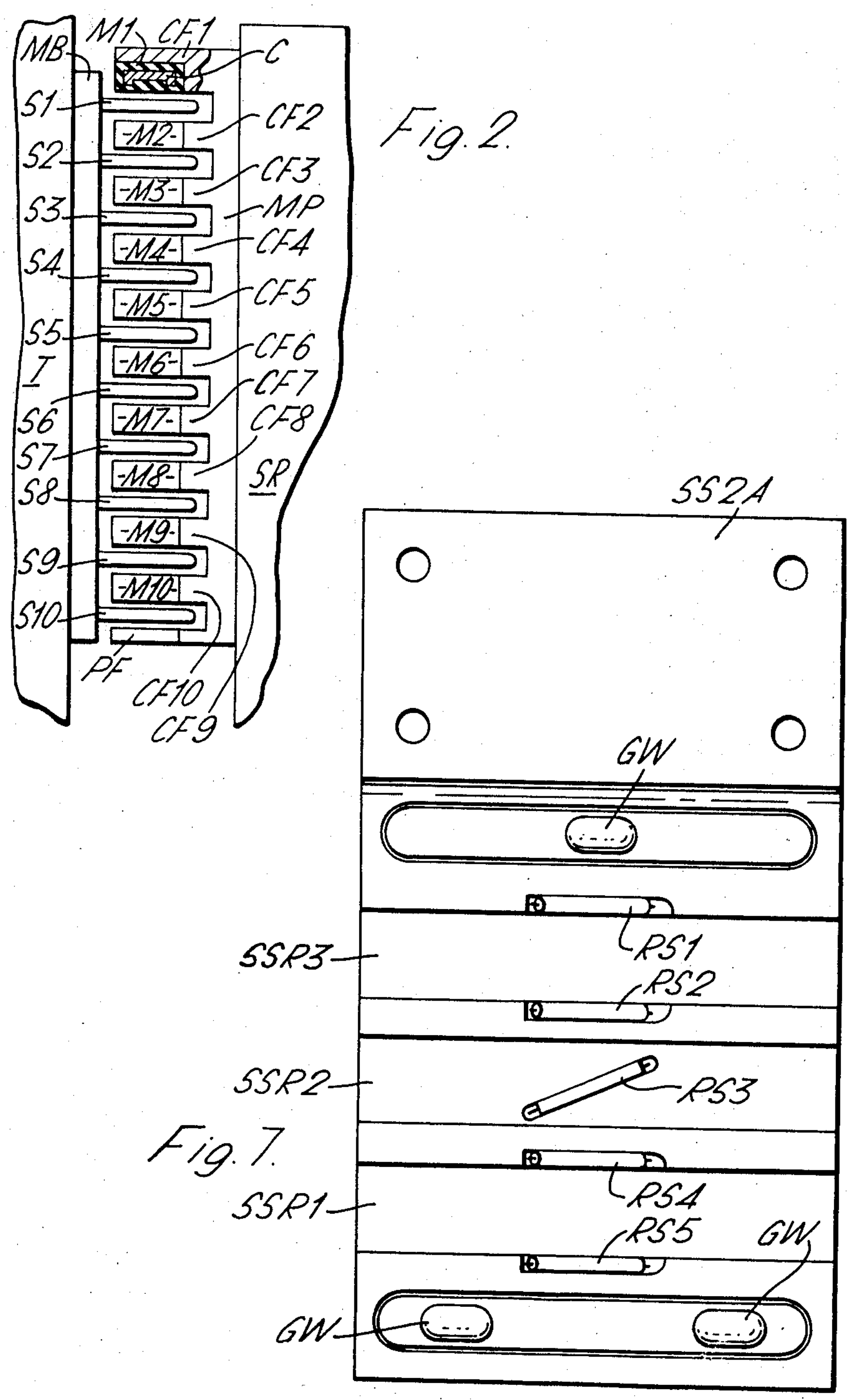
FIG. 2 shows in end elevation one form of a position sensing means.
FIG. 7 is a front elevation of part of the apparatus of FIG. 6.

Turning now to FIG. 2, there is shown (on a much larger scale) portions of two confronting vertical faces of one of the transporters T and of the rack SR; these portions may conveniently be at the position X (FIG. 1). Secured to the vertical face of the transporter by a mounting block MB, are ten horizontally projecting reed switches S1–S10; secured to the vertical face of the rack and extending along the entire length of the rack is a mounting plate MP from which ten horizontal carrier fins CF1–CF10 project. The outer end of the uppermost fin CF1 is recessed on its underside and in the recess is carried a magnetic strip M1. The remaining nine fins CF2–CF10 are shorter and carry similar magnetic strips M2–M10 on their ends, so as to be in vertical alignment with the strip M1. A protective fin PF projects from the bottom of plate MP.

It will be seen from FIG. 2 that each of the reed switches S1–S10 extends horizontally immediately below the correspondingly numbered one of the strips M1–M10 i.e. switch S1 below strip M1, and so on. The switches are each of the known form comprising a tube, usually of glass, containing a pair of normally open contacts (not shown) which contacts close when a magnetic field is applied across the tube. Strips M1–M10 each comprise a core C of magnetised material (see the sectional representation of strip M1, FIG. 2) surrounded by a plastic material. The core C has in cross section the form of a flattened U and is so magnetised that the tips of the U contain the two magnetic poles. It will be clear that the strip M1, as shown, creates a magnetic field below it to influence switch S1 but no significant magnetic field above it. All the strips M1–M10 are similarly oriented, hence each of the strips M2–M10 provide a magnetic field to influence the respective switches S2–S10 below them but do not affect the switches above them (i.e. switches S1–S9 respectively).

Figure 3:
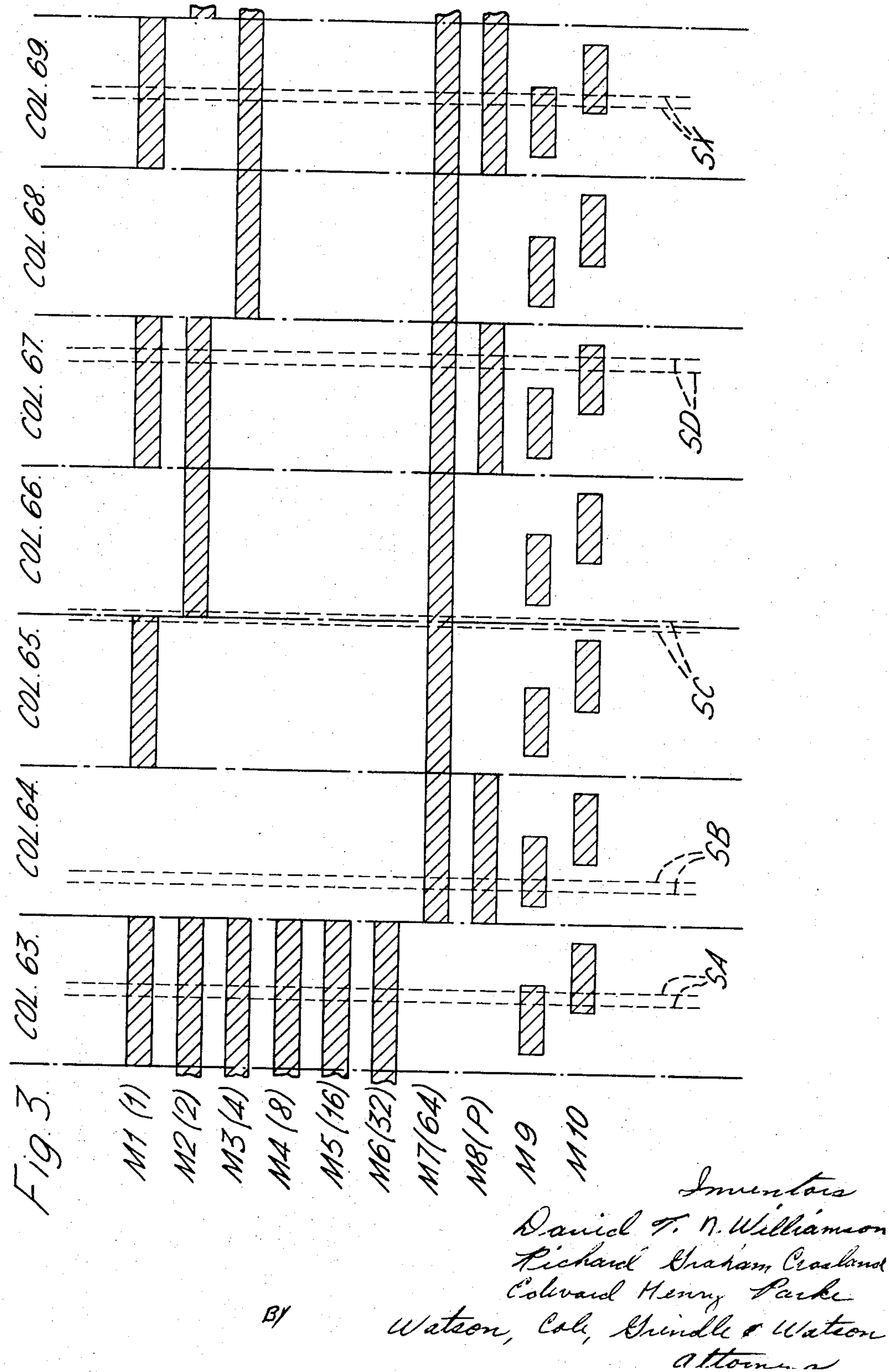
FIG. 3 is a diagram illustrating the arrangement of part of the position sensing means of FIG. 2.
Figures 4, 5:
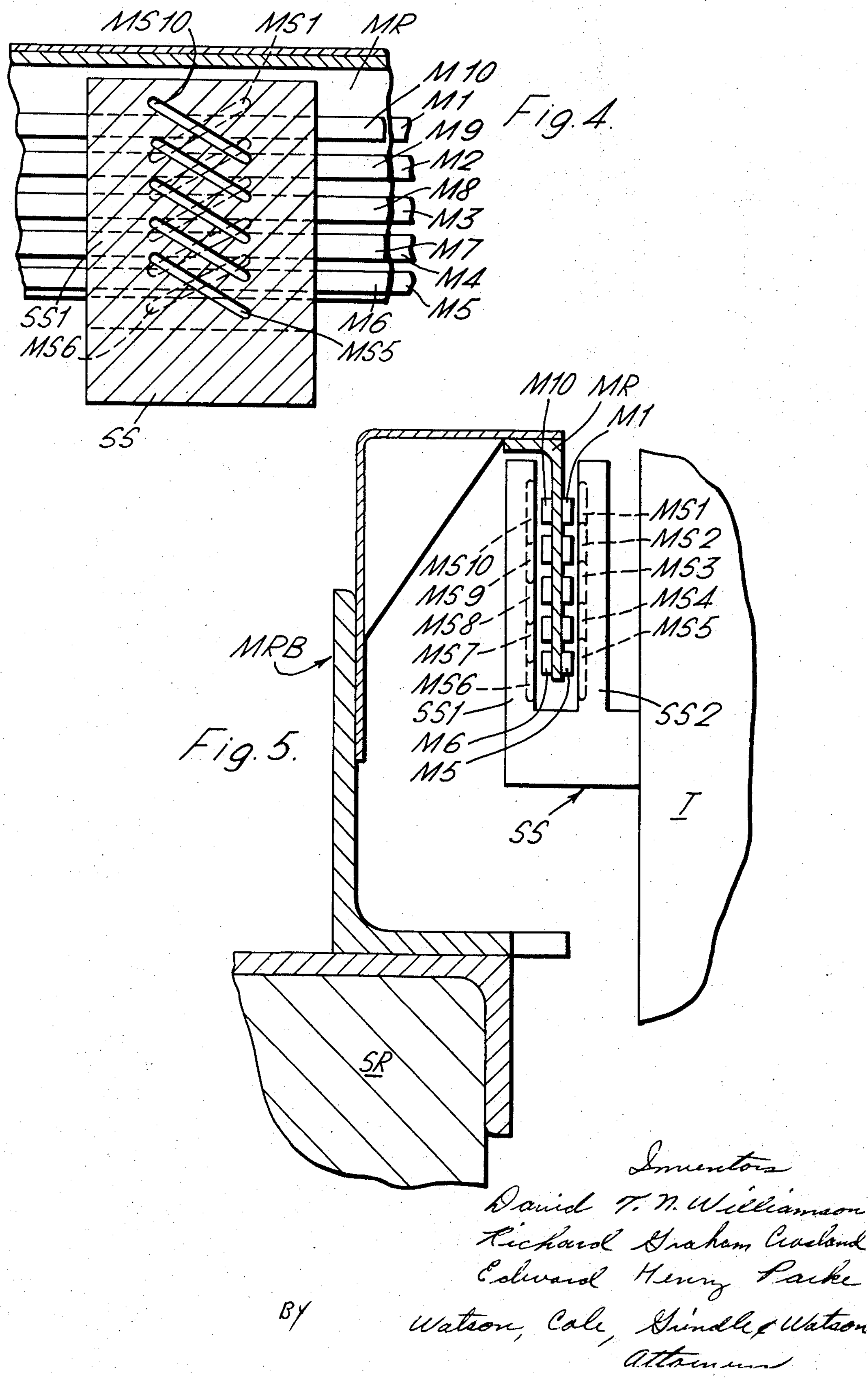
FIGS. 4 and 5 show, in front and end elevation respectively, one alternative form of position sensing means.

The magnetic strips M1–M10 do not extend the whole length of the rack SR. FIG. 3 illustrates diagrammatically the arrangement of these strips over a portion of the length of the rack; it will be observed that this figure is divided vertically by chain dotted lines into seven vertical bands and these represent seven consecutive columns of compartments, specifically (as shown at the top of FIG. 3) columns 63 to 69 inclusive, the columns being considered as being consecutively numbered with column 1 at the left-hand end.

Horizontal cross-hatched strips represent pieces of magnetic strip and the references M1–M10 therefor, employed in the foregoing, appear at the left-hand edge of FIG. 3. The various pieces of strips M1–M7 are so disposed that the combination of these strips present in any particular column forms an indication, in binary notation, of the number of that column. The presence of a piece of strip is representative of the digit 1, while absence of a piece of strip indicates the digit 0. The seven strips M1–M7 represent respectively the denominations 1–64 of the binary notation, and the individual denominational values are indicated in parenthesis after the strip references e.g. at the left of strip M3 appears the marking "M3(4)." Examining column 63, for example, pieces of strips M1, M2, M3, M4, M5, and M6 are present but no piece of strip M7. Writing down the corresponding binary digits (starting at strip M7 as representing the highest denomination) we get 0111111, which is merely the binary representation of 63, the column number.

Each of the switches S1–S7 will therefore at any instant be closed (representing the binary digit "1") or open (representing the binary digit "0") according to whether or not it is confronted by a portion of the corresponding one of the magnetic strips M1–M7; thus the combined state of this group of seven switches represents at any instant the number of the column in rack SR opposite which the transporter carrying the switches is then located.

It will be apparent that faulty operation of any one of the switches S1–S7 would cause an incorrect indication of the position of the transporter. To minimize the chance of such an occurrence, provision is made for a so-called "validity check." The magnetic strip M8 has portions so disposed relative to the portions of strips M1–M7 as to provide a "parity bit" indication at switch S8; the portions of the strip M8 are placed only in those columns in which an odd number of portions of strips M1–M7 are present, thus when one considers strips M1–M8 inclusive, every column contains an even number of strip portions.

Strips M9 and M10 each have a short portion in every column; the arrangement of these two short portions is identical in every column—each portion has a horizontal length of approximately one-half the width of a column, the portion of strip M9 being predominantly in the left-hand half of the column and the portion of strip M10 predominantly in the right-hand half. The portions of the two strips M9, M10 overlap in the center of each column and terminate short of the boundaries between columns at each side.

On FIG. 3 there are shown four pairs of parallel, vertical dashed lines SA, SB, SC, SD; these represent possible positions of the switches S1–S10 relative to the strips M1–M10. When the switches are in a position such as SA, i.e. substantially centrally of a column, it will be seen that as well as those of the switches S1–S8 corresponding to the column number (as above explained) both switch S9 and switch S10 are confronted by portions of their associated strips M9 and M10 and hence are closed.

When the switches are in a position such as SC, i.e. at (or near) a boundary between adjacent columns, neither S9 non S10 is confronted by magnetic strip hence both switches are open. At all other positions relative to a column, either switch S9 or switch S10 (but not both) is confronted by a portion of the associated strip M9 or M10 (and hence is closed). Positions SB, SD illustrate this condition; in position SB, with the switches in the left-hand half of a column, so that switch S9 is closed while S10 is open, and in position SD, with the switches in the right-hand half of a column, so that switch S10 is closed while S9 is open.

Before turning to description of electrical circuits in which switches S1–S10 are connected, two alternative arrangements of the switches will be described with reference to FIGS. 4 to 7.

The arrangement of FIG. 3 involves the mounting of the switches horizontally, which is unsuitable if it is desired to employ mercury-wetted reed switches, in which one contact member has a pool of mercury around its base so that the switch will only operate correctly when mounted in such an attitude that gravity does not cause the mercury to leave its designed position. In the alternative arrangement shown in FIGS. 4 and 5 the transporter T is provided with a switch support SS having two paralel upwardly-projecting arms SS1, SS2; each of the arms carries five mercury-wetted reed switches, comprising switches MS1–MS5 on the outer face of the inner arm SS2, and switches MS6–MS10 on the inner face of the outer arm SS1.

A mounting rail MR, carried by a bracket MRB on the storage rack SR, extends the full length of the rack SR and lies between the arms SS1, SS2 carrying-switches MS1–MS10. Magnetic strips M1–M10 are mounted on the rail MR, the strips being divided into portions extending over various columns or parts of columns of the rack SR as described with reference to FIG. 3. The switches MS1–MS10 are mounted to lie at an angle of some 30° to the horizontal (FIG. 4) which is sufficient to prevent the mercury in the switches from leaving its correct position.

Figure 6:
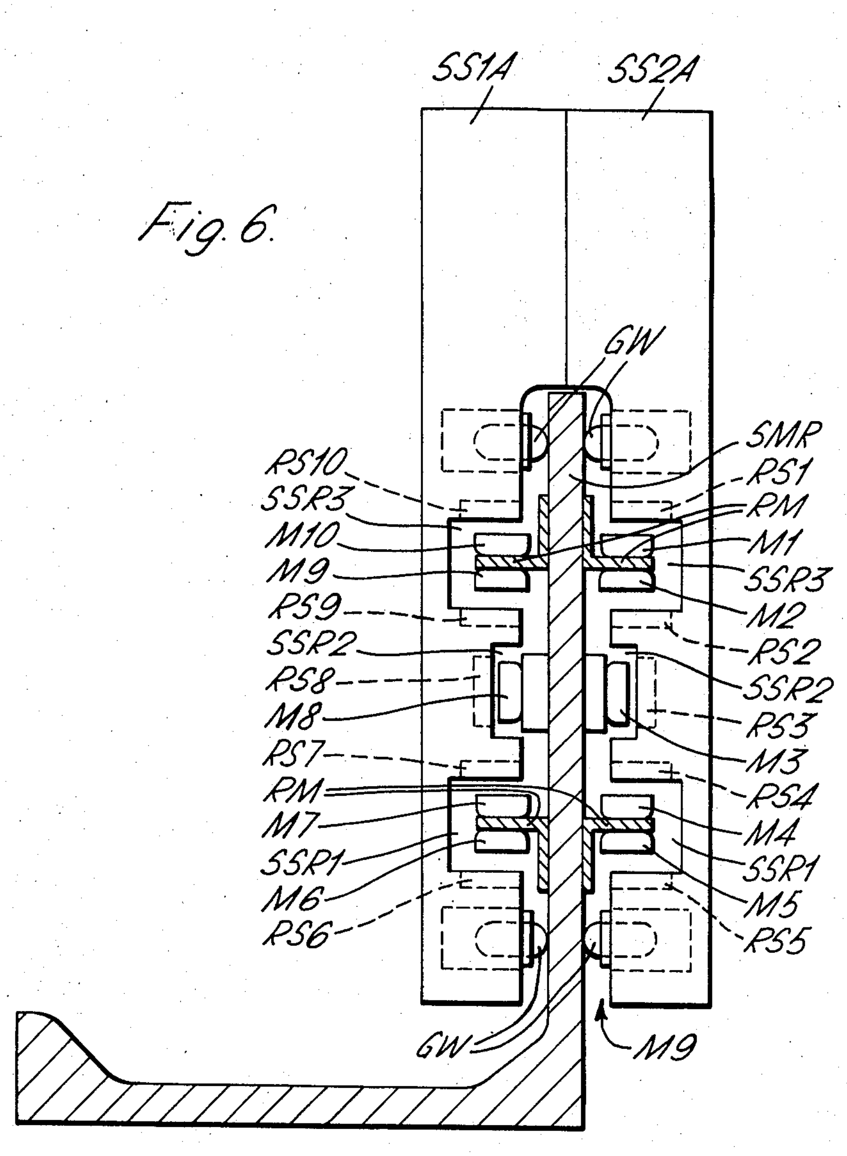
FIG. 6 is an end elevation of a further alternative form of position sensing means.

FIGS. 6 and 7 illustrate a further alternative arrangement of the switches. In this arrangement, the transporter T (not shown in FIGS. 6 and 7) has a switch support bracket comprising two complementary downwardly-projecting parts SS1A, SS2A; the upper end portions of these parts about and are secured together by set-screws (not shown), while their central and lower portions are relieved so as to provide a medial space MS within which a strip mounting rail SMR secured to the storage rack SR (not shown in FIGS. 6 and 7) is received. Two pairs of spring-mounted guide wheels GW rotatable about vertical axes are carried by the parts SS1A, SS2A engage the rail SMR to hold the latter symmetrically positioned between these parts during relative movement (perpendicular to the plane of FIG. 6) between the transporter T and the storage rack SR.

The inner faces of the parts SS1A, SS2A, are each formed with three recesses SSR1, SSR2, SSR3. The lowest and highest of these recesses, recesses SSR1 and SSR3 respectively, are deep while the intermediate recesses SSR2 are shallow. The horizontal upper and lower faces of the deep recesses SSR1, SSR3 each carry a reed switch and the vertical walls of the shallow recesses SSR2 each carry a reed switch; these switches are carried in pockets SP in the walls, and are identified in FIG. 6 by references RS1–RS10.

The rail SMR is provided with four right-angle members RM so placed as to project into the deep recesses SSR1, SSR3 of the parts SS1A, SS2A; the members RM carry magnetic strips in such positions as to confront the reed switches in the horizontal walls of the recesses. Between the members RM, the rail SMR carries two further magnetic strips which project into the shallow recesses SSR2 and hence confront the reed switches carried in the vertical walls of shallow recesses. The several magnetic strips are identified in FIG. 6 by references MS1–MS10; it will be seen that strip M1 confronts switch RS1, strip M2 confronts switch RS2, and so on as before.

It will be noted that in the arrangement of FIGS. 6 and 7 the reed switches are mounted at an angle to the longitudinal axes of their associated magnetic strips; this permits the working parts of the reed switches to derive the maximum effect from the magnetic strips without requiring the latter to be unduly wide. However, it will be seen that all the reed switches except switches RS3 and RS8 are horizontally disposed, hence in this arrangement mercury-weted switches are not used. In the arrangement of FIGS. 6 and 7, the magnetic strips are of course again divided into portions extending over various columns or parts of columns of the rack SR as described with reference to FIG. 3.

Figure 8:
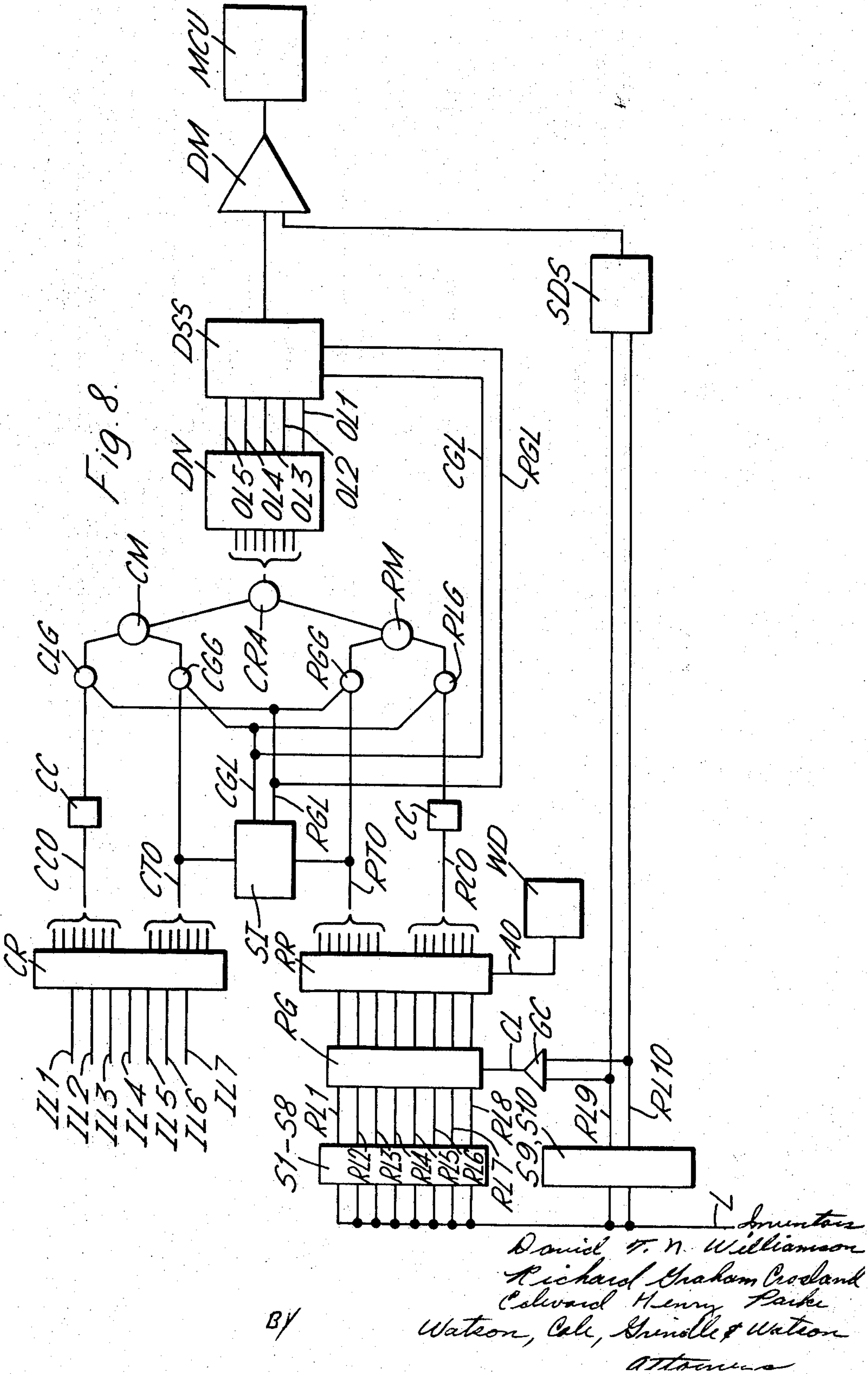
FIG. 8 is a schematic diagram of electrical circuits forming part of the device embodying the present invention.

Now turning to FIG. 8, this figure comprises a schematic diagram of electrical circuits to which the switches S1–S10 of FIG. 2 are connected. The switches S1–S10 are shown diagrammatically in two groups, containing respectively switches S1–S8 and switches S9, S10. (It will be understood that in place of switches S1–S10, switches MS1–MS10 (FIGS. 4 and 5) may be included in the circuits of FIG. 6.) This grouping has no reference to the physical positioning of the switches, but is related purely to their function as will appear.

Switches S1–S10 are connected between a common line L and individual read lines RL1–RL10 respectively. Lines RL1–RL8 are connected through a read gate RG to a read register RR. The gate RG is controlled by signals on a control line CL, these signals being derived from switches S9, S10 via the read lines RL9, RL10 and an OR circuit GC, so that the gate RG is open whenever either (or both) of the switches S9, S10 is closed.

A second register CR is connected to input lines IL1–IL7; the input lines are connected to a computer (not shown) which at appropriate times furnishes command signals via the lines IL1–IL7 to set register CR to the number of the column of rack SR to which transporter T is required to move.

The two registers RR, CR are in general mutually similar and are of such construction as to deliver, while storing any given number, two outputs representing respectively the true value and the complementary value of the stored number. These outputs each appear on seven lines but to avoid complication in the drawing they are bracketed together. Register RR is accordingly shown as having a true output on lnie RTO and a complement output on line RCO; the register CR has its true and complement outputs on lines CTO and CCO, respectively.

The register RR includes provision for checking the correctness or "validity" or the signals reaching it, employing the "parity bit" indication provided by switch S8. Any convenient known circuits may be included in the register for this purpose, and the register is provided with an alarm output AO which is energized if the validity check indicates an error; the alarm output may be connected to any desired form of warning device as indicated by element WD and/or may have a connection to control circuits (not shown) so that the transporter T cannot move when an error is indicated.

In each of the lines RCO, CCO there is provided a subtraction corrector circuit CC; each of these circuits serves merely to add 1 to the complement output of the associated register.

A comparator circuit SI, functioning as a sign indicator, has two inputs connected to the lines RTO, CTO, and has two outputs connected to lines CGL, RGL. The comparator SI is arranged to deliver an output on line CGL when the command signals last received, and hence the setting of register CR, represent a number greater than that indicated by the setting of register RR, or an output on line RGL when the setting of register RR represents a greater number than that indicated by the setting or register CR.

An ouput from comparator SI on line CGL holds open two gates CGG and RLG, while an output on line RGL holds open two gates CLG and RGG. The outputs of the gates CLG, CGG are connected via an OR circuit or mixer CM to one input of a full adder CRA; the outputs of the gates RGG, RLG are similarly connected via an OR circuit or mixer RM to the other input of the full adder CRA.

It will be apparent that the output of the full adder CRA always represents the numerical difference between the numbers represented by the settings of the register CR, RR, whichever of said numbers is the greater. If the number represented by the setting of register CR is the greater, them comparator SI provides an output on line CGL and gates CGG, RLG are open, gates CLG, RGG are closed. The inputs of adder CRA thus receive signals representing the true value of the number represented in register CR and the compliment (plus 1) of the number represented in register RR. The signals delivered by the adder CRA therefore represent the number represented in register CR minus the number represented in register RR.

Conversely, if the number represented by the setting of register RR is the greater, then comparator SI provides an output on line RGL and gates CLG, RGG are open, gates CGG, RLG are closed. The inputs of adder CRA receive signals representing the complement (plus 1) of the number represented in register CR and the true value of the number represented in register RR. In this case the output signals from adder CRA represent the number represented in register RR minus the number represented in register CR.

The output signals from adder CRA and the signals on lines CGL, RGL thus indicate the difference between the numbers represented in the two registers as to magnitude and sign, respectively.

The output signals from the adder CRA are delivered to a decoder network DN; this network is connected by five output line OL1–OL5 to a drive sense switch DSS and thence via an OR circuit DM, which may be termed a drive mixer, to a motor control unit MCU controlling the drive motor M for transporter T. The mixer DM has one other input, from the output of a logical circuit SDS serving as a slow drive switch with two inputs which are connected to the read lines RL9, RL10 associated with switches S9, S10 respectively.

The decoding network DN is arranged to deliver an output on one of the lines OL1–OL5 whenever it receives an input other than zero. (There is a zero input to network DN if registers CR, RR contain the same number, as none of the gates CLG, CGG, RGG, RLG are open.) Which of the lines OL1–OL5 is energized depends upon the magnitude of the input to network DN; conveniently, the output is on line OL1 if the input is one (i.e. the binary number 0000001), on line OL2 if the input is two (0000010), on line OL3 if the input is three (0000011), on line OL4 if the input is four (0000100) an on line OL5 if the input is five (0000101) or greater.

The magnitude of the output delivered by network DN is different as between its different output lines—when output line OL1 is energized, it carries only a small voltage which, when applied to unit MCU through switch DSS and mixer DM, causes the motor M to run slowly. Line OL2 when energized provides a larger voltage and hence faster operation of motor M, and so on progressively, energization of line OL5 providing the highest voltage and the fastest operation of the motor M.

The drive sense switch provides control of the sense movement of the transporter T, by causing the polarity of the voltage delivered by network DN to be either unchanged or reversed under control of the energization of lines CGL, RGL by the comparator or sense indicator SI.

The slow drive switch SDS serves to apply a small voltage through drive mixer DM to the motor control unit MCU when either one of the switches S9, S10 is closed, but delivers no output when both the switches S9, S10 are closed. The small voltage delivered by the switch SDS when switch S10 is closed and switch S9 is open, is of opposite polarity to that delivered when switch S9 is closed and switch S10 is open. When at the end of a period in which either one of the switches S9, S10 is open and the other closed, there is a change to the condition in which both the switches S9, S10 are open, the output from the switch SDS does not change in polarity, but increases somewhat in magnitude. However, even this larger output from switch SDS is small compared with the smallest output delivered by network DN and switch DSS.

For example, the various outputs from network DN and switch DSS may be such that the transporter T is driven at speeds ranging from 10 feet/sec. (when output line OL5 is energized) down to 1 foot/sec. (when output line OL1 is energized). In this instance, the lower output from switch SDS (when either one of the switches S9, S10 is closed) may be such that the transporter T is driven at a speed of 1 inch/sec., while the higher output from switch SDS (when both switches S9, S10 are open) gives the transporter T a speed of 2 inches/sec.

It will be appreciated that whenever the network DN and switches DSS are producing an output, then any output from switch SDS (even an output in the opposite sense and at the higher level) can be ignored for all practical purposes.

Having now described the various parts of the positioning device for one of the transporters T of FIG. 1, a typical operation of the device will now be described. It will be assumed that the transporter T is centrally located in front of column 69 of the storage rack SR. The switches S1–S10 will therefore be placed, relative to magnetic strips M1–M10, as indicated by dashed lines SX, FIG. 3. In this position portions of strips M9–M10 confront switches S9, S10 hence both these switches are closed and the slow drive switch SDS delivers no output.

Furthermore, as the last command received from the computer will have required movement of transporter T to column 69, the register CR will be set to represent the number sixty-nine. The register RR will have the same setting, as the gate RG is open (both switches S9, S10 being closed) and the switches S1–S7 are confronting a pattern of strip portions representing the number sixty-nine (1000101) and the switch S8 is correctly confronting a further strip portion so that an even number of the switches S1–S8 are closed, namely switches S1, S3, S7 and S8.

With the same number represented in registers CR, RR a zero input reaches network DN, which therefore delivers no output. Thus there is no energization of the motor control unit MCU through either of the inputs to drive mixer DM.

Now the computer delivers a command signal to register CR, resetting that register to the number sixty-three (0111111), as a command to the transporter T to move to column 63. Immediately, the comparator SI provides an output on line RGL, as the number sixty-nine in register RR is greater than the number sixty-three now in register CR, and gates CLG and RGG open. The adder CRA then receives, through command mixer CM, the complement (1000000) of the number sixty-three from register CR, plus the 1 added by the subtraction corrector CC in line CCO (making 1000001); through read mixer RM, the adder CRA receives the true value (1000101) of the number sixty-nine in register RR. The adder therefore performs the binary sum $$1000001+1000101=0000110$$

the result being equal to six (i.e. 69−63).

The decoding network DN thus receives the number six (0000110) at its input and delivers an output on line OL5 (its highest output) which, reaching the motor control unit MCU through drive sense switch DSS and mixer DM, causes motor M to operate at its highest speed. The polarity of energization, and hence the sense of operation of motor M, is determined by the switch DSS which is influenced by the energization of line RGL by comparator SI, due to the number sixty-nine in register RR being greater than the number sixty-three now in register CR. In this instance, the energization of motor M will be termed negative, and its sense of operation reverse, i.e. the motor M operates to move the transporter T towards the end of the rack SR at which column 1 is located, i.e. to the left in FIGS. 1 and 3.

As the transporter T moves, the first change of condition in the positioning device is when switch S10 opens as it moves clear of the portion of strip M10 found in column 69. This does not close gate RG, as switch S9 remains closed, but the slow drive switch SDS commences to deliver an output; by itself this output could cause a small positive energization of the motor control unit MCU, so that motor M would drive transporter T very slowly to the right, but in view of the maximum energization being provided by network DN, the output from switch SDS may be ignored.

The next change is when switch S9 opens, as it moves clear of the portion of strip M9 found in column 69. The output from switch SDS does not change in polarity, although it rises to its higher value, which can still be ignored; gate RG now closes, but the state of register RR does not change and therefore the elements SI, DN, and DSS are unaffected; transported T continues to travel at maximum speed to the left. Before the next change of state, due to switch S10 closing as it confronts the portion of strip M10 in column 68, the switches S1–S10 cross the boundary between column 69 and column 68, and there is a momentary confusion as to the stae of the switches; at this boundary the switches S1–S7 are required to change from the state representing sixty-nine (1000101) to the state representing sixty-eight (1000100), (which means that switch S1 has to open) and switch S8 also has to open. However, it is quite possible in practice for one of these two switches to open more quickly than the other, and thus for a moment provide an incorrect or "invalid" indication which, reaching the register RR, might operate the warning device WD. The closing of gate RG prevents this, as the register RR does not receive the new indication sixty-eight (1000100) until the switch S10 closes on confronting the portion of strip M10 in column 68, at which time all the switches S1–S8 are properly set to indicate sixty-eight (1000100).

With this closure of switch S10, gate RG opens and register RR resets to the value sixty-eight. This still exceeds the value sixty-three held in register CR, so the state of elements SI and DSS do not change. The difference value delivered by adder CRA to network DN falls from six to five, but at this new value the network DN still delivers an output on line OL5 and transporter T continues to move at maximum speed to the left.

The slow drive switch SDS does, however, reverse its state, reversing the polarity of its output which also falls to its lower value and hence now would serve alone to cause very slow movement of the transporter T to the left. Hence the output from switch SDS now tends to reinforce that delivered to mixer DM and motor control unit MCU by network DN and switch DSS.

The transporter T continues to the left, crossing column 68; as switches S1–S10 pass the center of the column the switches S9, S10 are both closed (due to the overlap of the portions of strips M9, M10) and there is temporarily no output from switch SDS. When switch S10 opens, leaving switch S9 closed, the lower-value output from switch SDS is again delivered, with polarity again such as to tend to drive the transporter T to the right; this can still be ignored.

As the switches S1–S10 cross the boundary from column 68 to column 67, the effect on the circuits is similar to that on crossing from column 69 to column 68; however, when gate RG again opens, it will be appreciated that the difference values reaching network DN will now be reduced to four (0000100) and hence network DN will deliver a lower voltage output, on line OL4; the speed of transporter T will therefore be reduced, although it continues to move to the left. With each subsequent crossing of a boundary between columns by switches S1–S10, there will be a further reduction in the speed of transporter T. In column 66, the different value reaching network DN is three and its output appears on line OL3; in column 65, the difference is two and line OL2 is energised, while in column 64, the difference is one and line OL1 is energized. Switches S9, S10 and switch SDS repeatedly go through the sequence of states previously described.

Lastly the switches S1–S10 cross the boundary between column 64 and column 63, where transporter T is required to stop. As switch S10 closes on confronting the portion of strip M10 in column 63, the gate RG opens, and register RR resets to sixty-three (0111111), the same value as is represented in register CR. As at the start (when both registers were set to the value sixty-nine) there is a zero input to network DN and the network delivers no output. The drive mixer DM and motor control unit MCU therefore receive only the lower output from the slow drive switch SDS, producing a very slow movement of transporter T to the left. This continues until switches S9, S10 reach the overlap between the portions of strips M9, M10 in the center of column 63; as switch S9 opens in addition to switch S10, the output from switch SDS vanishes, and hence the transporter T should stop with the switches S9, S10 confronting the overlap, i.e. the transporter should stop substantially opposite the centre of column 63.

If the transporter T should, however, overshoot slightly, as soon as switch S10 clears the end of the portion of strip M10 in column 63, switch S10 opens and the slow drive switch SDS delivers its lower output, with such polarity that motor M is energized for very slow movement of the transporter T to the right; this first exerts a braking effect on the transporter and then moves it very slowly back to the overlap of strips M9, M10 where again the motor M ceases to be energized and the transporter should stop. It will be understood that one overshoot may occur as the transporter enters the column in which it should stop at a speed greater than that provided when the motor M is energized through the slow drive switch alone, but that, with proper selection of the energization provided by the latter, a second overshoot may be made impossible for all practical purposes.

Should an overshoot be sufficient to cause switches S1–S10 not only to pass the central area of the desired column, but to approach the far boundary of that column so that switches S9, S10 are both open, then it will be understood that the switch SDS delivers its higher output, giving an enhanced braking effect and a speedier start to return movement of the transporter T if it stops while switches S9, S10 are both open. While an overshoot taking the transporter so far as to pass clear of the boundary area where switches S9, S10 are both open is virtually impossible, it will be noted that in this unlikely event the network DN and switch DSS will operate as soon as gate RG opens, causing output line OL1 to be energized, and this condition will persist until the switches S1–S10 have recrossed the boundary and encountered one of the portions of strips M9, M10 in the desired column.

Stoppage of the transporter before it reaches the desired column is not possible, due to the operation of gate RG as explained above, which means that the number represented in register RR does not change as soon as switches S1–S10 cross a column boundary but only when said switches are well into said column and encounter strip M9 (or M10 according to the direction of travel). Consequently, the network DN always receives a difference value of at least one and there is therefore, as a minimum an output on line OL1, until the switches S9, S10 encounter one of the portions of strips M9, B10 in the desired column.

What we claim as our invention and desire to secure by Letters Patent is:

1. A positioning device for controlling movement of one member relative to another, comprising; a plurality of markers fixed relative to one of said members, sensing means fixed relative to the other of said members to produce electrical position indications, command means for supplying electrical signals denoting a desired relative position of said members, electrical means arranged to respond to said electrical indications and said electrical signals, and drive means arranged to cause relative movement between said members, said markers being so disposed that the markers carried at any position along said one member form a pattern constituting a coded indication of said position, the sensing means being so arranged that the electrical indications produced at any instant correspond to the pattern of markers confronting said sensing means, and the electrical means being arranged to produce control signals for said drive means so that said drive means cause relative movement between said members until said electrical indications correspond in a predetermined manner to said electrical signals.

2. A device as claimed in claim 1, in which said markers comprise a plurality of parallel marker srtips each extending along different portions of the length of said one member so that at any position along the length of said member a combination of portions of the strips is present which denotes a number indicative of that position.

3. A device as claimed in claim 2 in which the sensing means comprises a plurality of reed switches and the markers are magnetic markers.

4. A device as claimed in claim 3 in which said strips are magnetized strips.

5. A device as claimed in claim 1, in which the sensing means and the command means are both so arranged that the electrical indications and electrical signals both represent positions in numerical coding and said electrical means is so arranged that the control signals produced at any instant represesnt the difference between the numbers represented by the electrical indications and the electrical signals at that instant.

6. A device as claimed in claim 5, in which the electrical means is so arranged that the control signals supplied to the drive means denote at any instant a speed and a direction of movement governed respectively by the numerical value and the sign of said difference.

7. A position sensing device comprising a plurality of reed switches each adapted to change its state (and hence provide an electrical indication) when subjected to a magnetic field, said switches being arranged to confront a plurality of magnetized marker strips arranged in portions forming a coded pattern, so that each switch confronting one of said strip portions is subjected to a magnetic field from the latter and provides one form of electrical indication while each switch not confronting one of said strip portions is not subjected to a magnetic field and provides another form of electrical indication, whereby for any selected position of said switches relative to said strips the electrical indications furnished by all the switches collectively correspond to the arrangement of said strips at the selected position.

8. A device as claimed in claim 7, in which the strips are secured to fins projecting horizontally from a vertical face of the one member in vertical allignment with one another and the switches are secured to a vertical face of the other member so as to project horizontally between said fins.

9. A device as claimed in claim 7, in which a mounting rail secured to the one member carries some of said strips on each of its faces, and support members are secured to the other member so as to lie on each side of said rail to carry said switches.

10. A device as claimed in claim 7, including right angle members secured to said rail, at least some of said strips being carried by said right angle members and corresponding switches being carried in recesses of said support members.

References Cited

UNITED STATES PATENTS

| | | | |
|---|---|---|---|
| 3,247,586 | 4/1966 | Westfall | 29—208 |
| 3,391,474 | 7/1968 | Hays | 29—208X |
| 3,475,805 | 11/1969 | Rottmann | 29—203 |

THOMAS H. EAGER, Primary Examiner

U.S. Cl. X.R.

29—208, 407